Figure 1:
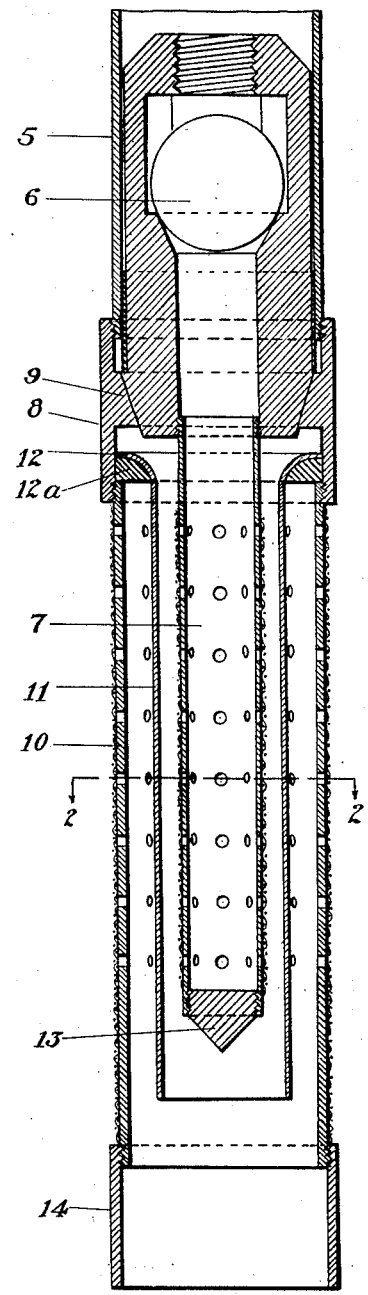

R. S. AND J. G. GARRY.
STRAINER FOR PUMPS.
APPLICATION FILED JULY 3, 1919.

1,329,171.

Patented Jan. 27, 1920.

Inventors
Robert S. Garry.
J. G. Garry

By

Attorneys

UNITED STATES PATENT OFFICE.

ROBERT S. GARRY AND JEROME G. GARRY, OF JENKS, OKLAHOMA.

STRAINER FOR PUMPS.

1,329,171.

Specification of Letters Patent.   Patented Jan. 27, 1920.

Application filed July 3, 1919.   Serial No. 308,460.

*To all whom it may concern:*

Be it known that we, ROBERT S. GARRY and JEROME G. GARRY, citizens of the United States, residing at Jenks, in the county of Tulsa and State of Oklahoma, have invented new and useful Improvements in Strainers for Pumps, of which the following is a specification.

This invention relates to strainers employed in connection with oil-well and other pumps for keeping sand and other solid particles out of the working barrel.

The invention has for its object to provide a strainer of this kind which is highly efficient in operation, and which can be applied to any ordinary standing valve without alterations or modifications in the structure of said valve and the associated fittings.

The object stated is attained by means of a novel combination and arrangement of parts to be hereinafter described and claimed, and in order that the same may be better understood, reference is had to the accompanying drawing forming a part of this specification.

Figure 2:
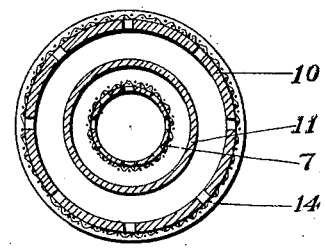

In the drawing,

Figure 1 is a central vertical section showing the application of the invention, and Fig. 2 is a cross-section on the line 2—2 of Fig. 1.

Referring specifically to the drawing, 5 denotes the lower end of the working barrel of an oil-well or other pump. At the bottom of the working barrel is the usual standing valve 6 to the inlet of which is connected a depending strainer tube 7. On the lower end of the working barrel is also screwed a coupling sleeve 8 having the usual seat 9 for the standing valve. This coupling sleeve supports a strainer tube 10 which surrounds the strainer tube 7 in spaced relation therewith. Inside the strainer tube 10 and surrounding the strainer tube 7 is an imperforate tube 11. The upper end of the tube 11 is flared, as shown at 12, and extends into the coupling sleeve 8. The flared end of the tube 11 is opposite and overhangs the upper end of the strainer tube 10, and it is thus supported by the latter when screwed into the sleeve 8. A packing 12ª is interposed between the upper end of the tube 10 and the flare 12 of the tube 11 to make a fluid-tight joint. The bottom of the strainer tube 7 is closed by a tapered plug 13 so that it may be pulled up at any time and dropped back without sticking in the working barrel or other parts through which it passes.

To the lower end of the tube 10 is connected a coupling sleeve 14, and it will be noted that this tube extends a short distance lower down than the tube 11, whereas the latter, in turn, extends a short distance lower down than the tube 7.

In operation, the oil or other liquid to be pumped is subjected to two straining operations so that there is no chance for sand and other solid matter passing into the working barrel 5 and clogging the valves. The oil or other liquid first enters the strainer tube 10 and passes down the space between the inside thereof and the outside of the tube 11, and as the latter tube is open at the bottom and the tube 7 is closed at the bottom, the oil or other liquid flows upwardly in the space between the inside of the tube 11 and the outside of the tube 7 and passes into the latter and thence to the standing valve 6. The two strainer tubes are perforated in their sides and provided with a screen covering as usual. The oil or other liquid cannot enter the tube 10 at the bottom as the latter is closed by the sleeve 14 seating on the bottom of the well hole.

The device is very simple and highly efficient in operation, and it effectually serves the purpose for which it is designed. It will be noted that no changes in the structure of the standing valve are necessary, and ordinary fittings are employed for securing the several tubes in place.

We claim:

1. The combination with the working barrel of a pump; of a strainer tube at the entrance of the working barrel, an imperforate tube surrounding the strainer tube in spaced relation, and a second strainer tube surrounding the imperforate tube in spaced relation.

2. The combination with the working barrel of a pump; of a strainer tube at the entrance of the working barrel, an imperforate tube surrounding the strainer tube in spaced relation, and a second strainer tube surrounding the imperforate tube in spaced relation, the spaces between the tubes being closed at the top thereof, and the imperforate tube being open at the bottom.

3. The combination with the working barrel of a pump, and a coupling sleeve connected to the lower end thereof; of a depending strainer tube extending into and carried by the coupling sleeve, an imperforate tube inside the strainer tube and supported thereby, said imperforate tube having a flared upper end engageable by the corresponding end of the strainer tube, and a strainer tube inside the imperforate tube and connected to the inlet of the working barrel.

4. The combination with the working barrel of a pump; of a strainer tube extending from the inlet of the working barrel, a second strainer tube surrounding said tube, and a wall between said tubes shutting off direct communication therebetween.

In testimony whereof we affix our signatures.

ROBERT S. GARRY.
JEROME G. GARRY.